M. W. FRANKLIN.
OZONATOR.
APPLICATION FILED OCT. 31, 1912.

1,064,065.

Patented June 10, 1913.
2 SHEETS—SHEET 1.

Witnesses
Chas. B. Stokes
Marcus L. Byng

Inventor
Milton W. Franklin
by His Attorney

M. W. FRANKLIN.
OZONATOR.
APPLICATION FILED OCT. 31, 1912.

1,064,065.

Patented June 10, 1913.
2 SHEETS—SHEET 2.

Witnesses
Chas. B. Stokes
Marcus L. Byng

Inventor
Milton W. Franklin
by Albert G. Davis
His Attorney

UNITED STATES PATENT OFFICE.

MILTON W. FRANKLIN, OF SCHENECTADY, NEW YORK, ASSIGNOR TO GENERAL ELECTRIC COMPANY, A CORPORATION OF NEW YORK.

OZONATOR.

1,064,065. Specification of Letters Patent. Patented June 10, 1913.

Application filed October 31, 1912. Serial No. 728,810.

*To all whom it may concern:*

Be it known that I, MILTON W. FRANKLIN, a citizen of the United States, residing at Schenectady, in the county of Schenectady, State of New York, have invented certain new and useful Improvements in Ozonators, of which the following is a specification.

My invention has reference to a novel device for the production of a gaseous reaction by a static discharge, and has for its object more particularly the production of a device of this character which is cheap, compact and efficient.

For a fuller understanding of my invention, reference is had to the accompanying drawings, in which my invention is illustrated and in which—

Figure 1:
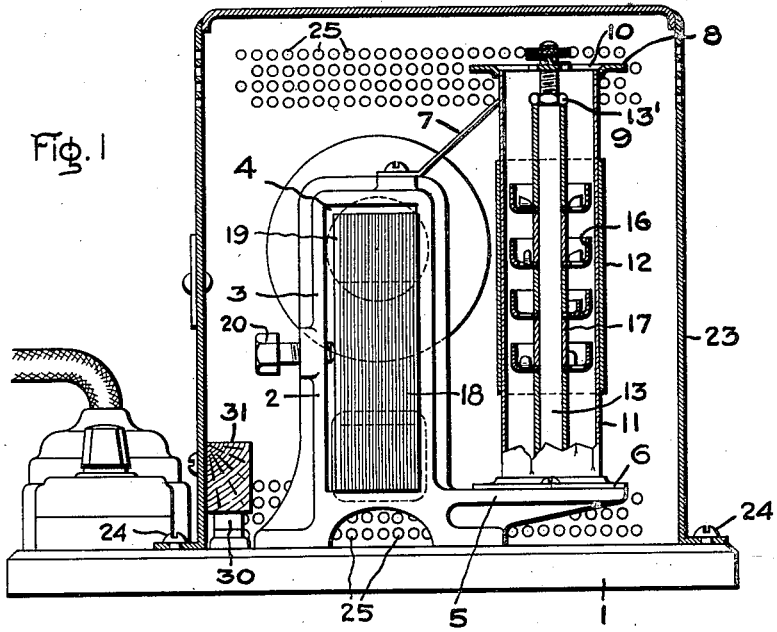
Figure 2:
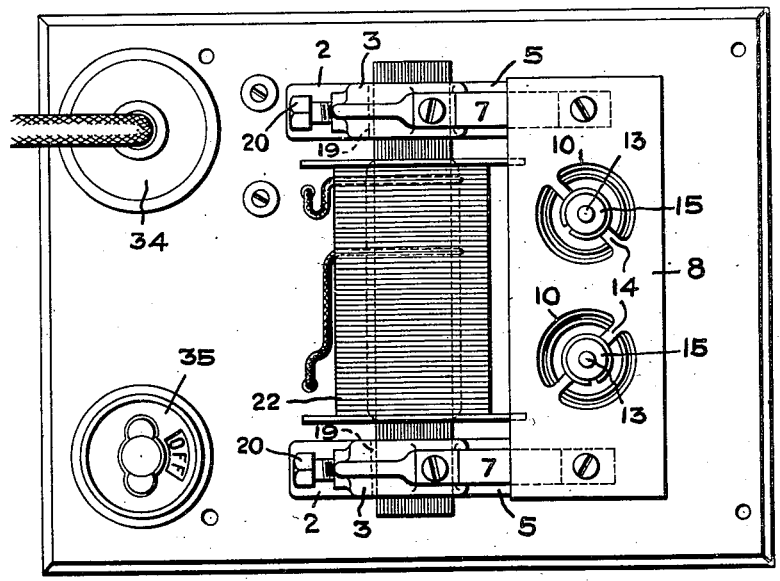
Figure 3:
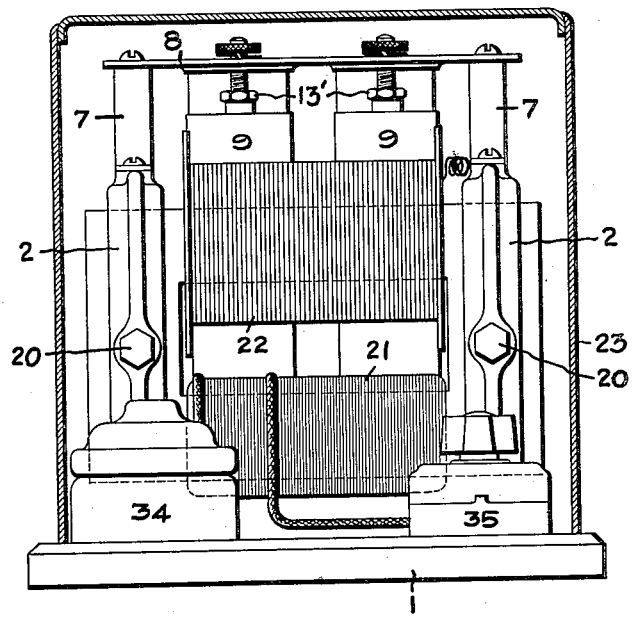

Figure 1 is a vertical sectional elevation of the machine; Fig. 2 is a plan view with the casing removed; Fig. 3 is a sectional elevation at right angles to Fig. 1 and Fig. 4 is a diagram of the electrical connections.

In the drawings 1 is a base upon which is mounted a frame, here shown as comprising two members 2 having vertically disposed portions 3 provided with openings 4 and also having horizontally disposed arms 5 on which is mounted a plate 6. Two arms 7 also extend outwardly from the tops of the two members of the frame 2, and a plate 8 is supported upon the outer ends of these arms. Any number of ozone units 9, here illustrated as two, are clamped between the plates 6 and 8. The plates are provided with openings 10 (not shown in the lower plate in the drawings) with which register dielectric tubes 11 which may conveniently be made of glass, and which are comprised in the ozone units 9. Each of these tubes is surrounded by a cylindrical conducting member 12 which constitutes the outer electrode and which may be made by winding copper wire upon the tube and electroplating the same. Each ozone unit also comprises a rod or bar 13 passing through ribs or spiders 14 extending across the openings 10. The ends of these rods are threaded to receive thumb nuts 15 by which the rods are clamped between the plates 6 and 8. The rod 13 is surrounded by a series of dished plates 16, held in position by suitable spacing sleeves 17, which are in turn held in position by nuts 13′ which engage the threaded ends of the bars 13. These plates 16 constitute the inner electrode of the ozone unit, the static discharge taking place between the flanged edges of these plates and the outer electrode 12 through the dielectric member 11. The centers of the plates 16 are stamped upwardly in such a form as to deflect the air passing upwardly therethrough outwardly between the flanged edges of the plates and the dielectric tubes 11, as more fully explained in my pending application, Serial No. 656,003, which was filed October 21, 1911. The core 18 of a transformer is mounted in the openings 4 of the frame and is secured in position by plates 19, which are received in the openings 4 between the frame and the core. Screws 20 clamp the plates 19 and the core of the transformer in position. The primary and secondary windings of the transformer are indicated at 21 and 22, respectively. The entire mechanism is inclosed by a casing 23 which is secured to the base by screws 24 or other suitable fastening means. The casing is provided at the top and bottom with suitable openings 25.

Figure 4:
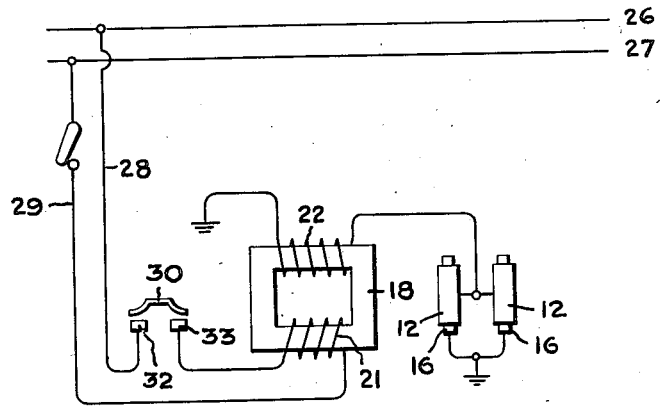

The circuit connections are shown in Fig. 4, in which 26 and 27 are conductors carrying an alternating current. The terminals of the primary 21, of the transformer are connected to the conductors 26 and 27 by leads 28 and 29 respectively. A bridging conductor 30 is carried by a block 31 which is in turn carried by the casing 23. The bridging piece 30 engages two contacts 32 and 33 when the casing is in position on the machine. These contacts are included in the primary of the transformer, so that when the casing is in position, the circuit of the primary is closed, but when the casing is removed the circuit of the primary is opened, thereby avoiding any risk from shock by contact with high tension members. One terminal of the secondary of the transformer is grounded to the frame, while the other terminal is connected to the outer electrodes 12 in multiple, the inner electrodes 16 being grounded to the frame. A rosette of usual form for the machine is shown at 34 and a usual form of switch at 35.

In operation, a high potential is created between the electrodes 12 and 16 by the transformer which causes a discharge to take place through the dielectric 11 and through the space between the electrodes, thereby converting the oxygen of the air into ozone in a well known manner. The heat developed in the ozone units causes an upward draft to be created through the same, fresh air being drawn into the casing through the openings in the bottom thereof, the ozonized air which issued from the ozone units passing out through the openings in the top of the casing.

What I claim as new and desire to secure by Letters Patent of the United States, is:—

1. In a device for producing a gaseous reaction by a static discharge, a base, a frame mounted thereon provided with one or more openings, one or more arms extending longitudinally from said frame, a plate mounted upon said arms and having openings, hollow units comprising electrodes for producing a gaseous reaction by a static discharge mounted upon said plate and registering with said openings, and means for producing a difference of potential between the electrodes in said units comprising a transformer whose core is mounted in the openings in said frame.

2. In a device for producing a gaseous reaction by a static discharge, a base, a frame mounted thereon comprising two similar members having openings, arms extending longitudinally from said members, a plate provided with openings mounted upon said arms, hollow units comprising electrodes for producing a gaseous reaction by a static discharge mounted upon said plate and registering with the openings therein, and means for creating a difference of potential between the electrodes of said units comprising a transformer whose core is mounted in the openings of said frame.

3. In a device for producing a gaseous reaction by a static discharge, a base, a frame mounted thereon comprising two similar members having openings, arms extending longitudinally from the top and the bottom of said members, plates provided with openings mounted upon the top and bottom arms, hollow units for producing a gaseous reaction by a static discharge mounted between said plates and registering with the openings therein, and means for creating a difference of potential between the electrodes of said units comprising a transformer whose core is mounted in the openings of said frame.

In witness whereof, I have hereunto set my hand this 30th day of October 1912.

MILTON W. FRANKLIN.

Witnesses:
HELEN ORFORD,
MARGARET E. WOOLLEY.